UNITED STATES PATENT OFFICE.

FREDERICK AUGUST LOBERT, OF NATIONAL CITY, ASSIGNOR, BY DIRECT AND MESNE ASSIGNMENTS, OF TWO-THIRDS TO CHRIST SCHALLBERGER AND H. R. ROOD, OF SAN DIEGO, CALIFORNIA.

COMPOUND FOR PRESERVING TIMBER.

SPECIFICATION forming part of Letters Patent No. 546,960, dated September 24, 1895.

Application filed February 14, 1895. Serial No. 538,421. (No specimens.)

*To all whom it may concern:*

Be it known that I, FREDERICK AUGUST LOBERT, a citizen of the United States, residing at National City, in the county of San Diego and State of California, have invented certain new and useful Improvements in Compounds for the Destruction of Teredos; and I do hereby declare the following to be a full, clear, and exact description of the invention, such as will enable others skilled in the art to which it appertains to make and use the same.

My invention relates to an improved compound for the destruction of teredos and other animal life contained in salt-water which attack piles and other submerged woodwork.

The invention consists of the following ingredients: asphaltum, eight pounds; crude petroleum, two pounds; creosote, one pound and eight ounces; sulfur, one pound; common salt, three pounds; Portland cement, four pounds; ground cinders, one pound; unslaked lime, eight ounces; asbestos, twelve ounces; mica, three ounces, and ground copper, any desired amount. This segregation of ingredients is thoroughly mixed and commingled in the proper consistency to be readily applied. The whole is put onto burlap, and when ready to be used is boiled by an open fire and thoroughly mixed, with the exception of the copper and the burlap. The copper does not enter into the mixture, but is put onto the outside covering. In addition to the burlap, wire-netting may also be employed to reinforce the burlap and supply a securing means to hold the compound.

Having now described my invention, what I claim as new, and desire to secure by Letters Patent, is—

The herein described compound consisting of asphaltum, crude petroleum, creosote, sulfur, common salt, Portland cement, ground cinders, unslaked lime, asbestos, mica and ground copper, substantially as and in the proportions described.

In testimony whereof I have signed this specification in the presence of two subscribing witnesses.

FREDERICK AUGUST LOBERT.

Witnesses:
 GEO. W. BEERMAKER,
 R. W. GRANT.